(12) United States Patent
Kakeya et al.

(10) Patent No.: US 12,273,502 B2
(45) Date of Patent: Apr. 8, 2025

(54) IMAGE DISPLAY DEVICE AND IMAGE DISPLAY METHOD

(71) Applicant: UNIVERSITY OF TSUKUBA, Tsukuba (JP)

(72) Inventors: Hideki Kakeya, Tsukuba (JP); Hayato Mitomi, Tsukuba (JP)

(73) Assignee: UNIVERSITY OF TSUKUBA, Tsukuba (JP)

( * ) Notice: Subject to any disclaimer, the term of this patent is extended or adjusted under 35 U.S.C. 154(b) by 31 days.

(21) Appl. No.: 18/032,299

(22) PCT Filed: Oct. 19, 2021

(86) PCT No.: PCT/JP2021/038578
§ 371 (c)(1),
(2) Date: Apr. 17, 2023

(87) PCT Pub. No.: WO2022/085676
PCT Pub. Date: Apr. 28, 2022

(65) Prior Publication Data
US 2023/0396755 A1    Dec. 7, 2023

(30) Foreign Application Priority Data

Oct. 19, 2020  (JP) ................................ 2020-175498

(51) Int. Cl.
*H04N 13/312*    (2018.01)
*H04N 13/305*    (2018.01)
*H04N 13/315*    (2018.01)

(52) U.S. Cl.
CPC ......... *H04N 13/312* (2018.05); *H04N 13/305* (2018.05); *H04N 13/315* (2018.05)

(58) Field of Classification Search
CPC ........ G02B 30/27; G02B 30/31; G02B 30/33; H04N 13/305; H04N 13/312;
(Continued)

(56) References Cited

U.S. PATENT DOCUMENTS

| 5,959,664 A | 9/1999 | Woodgate |
| 6,445,406 B1 | 9/2002 | Taniguchi et al. |

(Continued)

FOREIGN PATENT DOCUMENTS

| EP | 3575854 A1 | 12/2019 |
| GB | 2405543 A | 3/2005 |

(Continued)

OTHER PUBLICATIONS

Ayuki H(Machine translation of WO 2019111964 A1) (Year: 2019).*

(Continued)

*Primary Examiner* — Christopher S Kelley
*Assistant Examiner* — Ana Picon-Feliciano
(74) *Attorney, Agent, or Firm* — Troutman Pepper Locke, LLP; Tim Tingkang Xia, Esq.

(57) ABSTRACT

An image display device displays a stereoscopic image by using a parallax barrier method and includes a transmissive image display surface on which images of left-eye image data and right-eye image data are alternately displayed; an image forming unit including optical members having strip-shaped patterns with optical properties arranged on a surface located on a back surface side of the image display surface; and strip-shaped light sources arranged on an illumination arrangement surface, which is a surface located on a back surface side of the image forming unit, and configured to irradiate the image display surface with illumination light. A slit area of the parallax barrier method is formed by an image obtained by forming an image of the illumination light from the strip-shaped light sources on the back surface side of the image display surface by using the optical members of the image forming unit.

7 Claims, 11 Drawing Sheets

(58) Field of Classification Search
CPC .... H04N 13/315; H04N 13/32; H04N 13/385; H04N 13/31; H04N 13/317; H04N 13/225
USPC .......................................................... 348/51
See application file for complete search history.

(56) References Cited

U.S. PATENT DOCUMENTS

| | | | | |
|---|---|---|---|---|
| 10,171,801 | B2 | 1/2019 | Yang et al. | |
| 2008/0094700 | A1* | 4/2008 | Uehara | H04N 13/305 359/463 |
| 2021/0274157 | A1* | 9/2021 | Kusafuka | G02B 30/28 |

FOREIGN PATENT DOCUMENTS

| | | | | |
|---|---|---|---|---|
| GB | 2428129 A | * | 1/2007 | ......... G02B 27/2214 |
| JP | H05107663 A | | 4/1993 | |
| JP | 08505014 A | | 5/1996 | |
| JP | 08237691 A | | 9/1996 | |
| JP | 2005078091 A | | 3/2005 | |
| JP | 2015004864 A | | 1/2015 | |
| JP | 2015125407 A | | 7/2015 | |
| WO | 9406249 A1 | | 3/1994 | |
| WO | 2018139611 A1 | | 8/2018 | |
| WO | WO-2019111964 A1 | * | 6/2019 | ............. G02B 30/22 |

OTHER PUBLICATIONS

Japan Patent Office, "International Search Report for PCT Application No. PCT/JP2021/038578", Japan, Jan. 11, 2022.

European Patent Office, European Search Report for Application No. 21882817.6, Europe, Sep. 5, 2024.

* cited by examiner

IMAGE DISPLAY DEVICE AND IMAGE DISPLAY METHOD

CROSS-REFERENCE TO RELATED PATENT APPLICATION

This application claims priority to Japanese Patent Application No. JP 2020-175498 filed on Oct. 19, 2020, the content of which is incorporated herein by reference.

FIELD OF THE INVENTION

The present invention relates to an image display device and an image display method.

BACKGROUND OF THE INVENTION

In recent years, research and development has been carried out on an image display device that enables a stereoscopic view of images without the use of eyeglasses. A known image display device that enables a stereoscopic view of images without the use of eyeglasses includes an autostereoscopic video display device of a parallax barrier method based on time division (Patent Document 1).

The autostereoscopic video display device described in Patent Document 1 overlaps two liquid crystal panels, alternately displays a right-eye image and left-eye image on one of the liquid crystal panels, and displays a parallax barrier on the other of the liquid crystal panels (which is called an active parallax barrier method).

CITATION LIST

Patent Document

Patent Document 1: JP 2015-125407A

SUMMARY OF THE INVENTION

Technical Problem

Unfortunately, the autostereoscopic video display device described in Patent Document 1 uses two liquid crystal panels overlapped, lowering the transmittance of illumination light. For this reason, the autostereoscopic video display device described in Patent Document 1 needs to use a backlight having an extremely high luminance and high power consumption.

Reduction of power consumption of an image display device for displaying stereoscopic images by using a parallax barrier method has been awaited.

The present invention has been made in view of the above-described points and provides an image display device for displaying stereoscopic images by using a parallax barrier method and an image display method that can reduce power consumption of the image display device.

Solution to Problem

The present invention has been made to solve the above-described problems, and an aspect of the present invention is an image display device for displaying a stereoscopic image by using a parallax barrier method. The image display device includes: an image display surface on which an image of left-eye image data and an image of right-eye image data are alternately displayed, the image display surface being transmissive; an image forming unit including a plurality of optical members having a plurality of strip-shaped patterns with optical properties arranged on a surface located on a back surface side of the image display surface; and a plurality of light sources having a strip shape arranged on an illumination arrangement surface, which is a surface located on a back surface side of the image forming unit, and configured to irradiate the image display surface with illumination light. A slit area of the parallax barrier method is formed by an image obtained by forming an image of the illumination light from the strip-shaped light sources on the back surface side of the image display surface by using the optical members included in the image forming unit.

The optical members having a columnar shape will be described below as lenticular lenses.

An aspect of the present invention is the image display device, and the parallax barrier method is a parallax barrier method based on time division. The image display device further includes: an illumination arrangement surface control unit configured to change an arrangement of a light emitting region on the illumination arrangement surface in which the illumination light is generated by changing any of the plurality of light sources having a strip shape to emit light; and an image display surface control unit configured to control the image display surface based on the left-eye image data and the right-eye image data. The image display surface control unit controls, in accordance with an arrangement of the slit area that changes according to the arrangement of the light emitting region, each area of a left image region on the image display surface in which an image of the left-eye image data is displayed and a right image region on the image display surface in which an image of the right-eye image data is displayed.

An aspect of the present invention is the image display device. The image display device further includes a position information acquisition unit configured to acquire position information indicating an observer distance, which is the distance between at least one eye of eyes of an observer observing the image display surface and the image display surface. The image display surface control unit controls each area of the left image region and the right image region based on the observer distance indicated by the position information acquired by the position information acquisition unit.

An aspect of the present invention is the image display device. In the image display device, a distance D that is the distance between the light source and the image forming unit, a distance d that is the distance between the image forming unit and the back surface side of the image display surface, a slit width w that is the width of the slit area, and a pitch $W_1$ that is the distance between centers of the plurality of optical members adjacent to each other arranged in the image forming unit have a relationship represented by Equation (2), where the number of divisions in the time division is a number n.

An aspect of the present invention is the image display device. In the image display device, the arrangement of the light emitting region on the illumination arrangement surface in which the illumination light is generated does not change over time.

An aspect of the present invention is an image display method of an image display device for displaying a stereoscopic image by using a parallax barrier method. The image display device includes: an image display surface on which an image of left-eye image data and an image of right-eye image data are alternately displayed, the image display surface being transmissive; an image forming unit including a plurality of optical members having a plurality of strip-shaped patterns with optical properties arranged on a surface located on a back surface side of the image display surface; and a plurality of strip-shaped light sources arranged on an illumination arrangement surface, which is a surface located on a back surface side of the image forming unit, and configured to irradiate the image display surface with illumination light. The image display method includes: causing, of the plurality of strip-shaped light sources, a light source corresponding to a light emitting region on the illumination arrangement surface in which the illumination light is generated to emit light; forming a slit area of the parallax barrier method with an image obtained by forming an image of the illumination light from the strip-shaped light sources on the back surface side of the image display surface by using the optical members included in the image forming unit; and controlling the image display surface based on the left-eye image data and the right-eye image data.

Advantageous Effects of the Invention

The present invention can reduce power consumption of the image display device for displaying a stereoscopic image by using a parallax barrier method.

DETAILED DESCRIPTION OF THE INVENTION

Embodiments

Embodiments of the present invention will be described below in detail with reference to the drawings. For explanatory convenience, the drawings illustrate an XYZ orthogonal coordinate system which is a three-dimensional orthogonal coordinate system. In the XYZ orthogonal coordinate system, a direction of a Z axis is vertically upward. In the following description, a direction parallel to the Z axis is also referred to as a vertical direction. The direction of the Z axis is also referred to as an upward direction. A direction opposite to the direction of the Z axis is also referred to as a downward direction. A positive side in a Z-axis direction is also referred to as an upper side, and a negative side in the Z-axis direction is also referred to as a lower side. A direction parallel to an X axis is also referred to as a depth direction. A positive side in an X-axis direction is also referred to as a front side, and a negative side in the X-axis direction is also referred to as a back side. A direction parallel to a Y axis is also referred to as a horizontal direction. A positive side in a Y-axis direction is also referred to as a right side, and a negative side in the Y-axis direction is also referred to as a left side.

Configuration of Parallax Barrier

Figure 1:
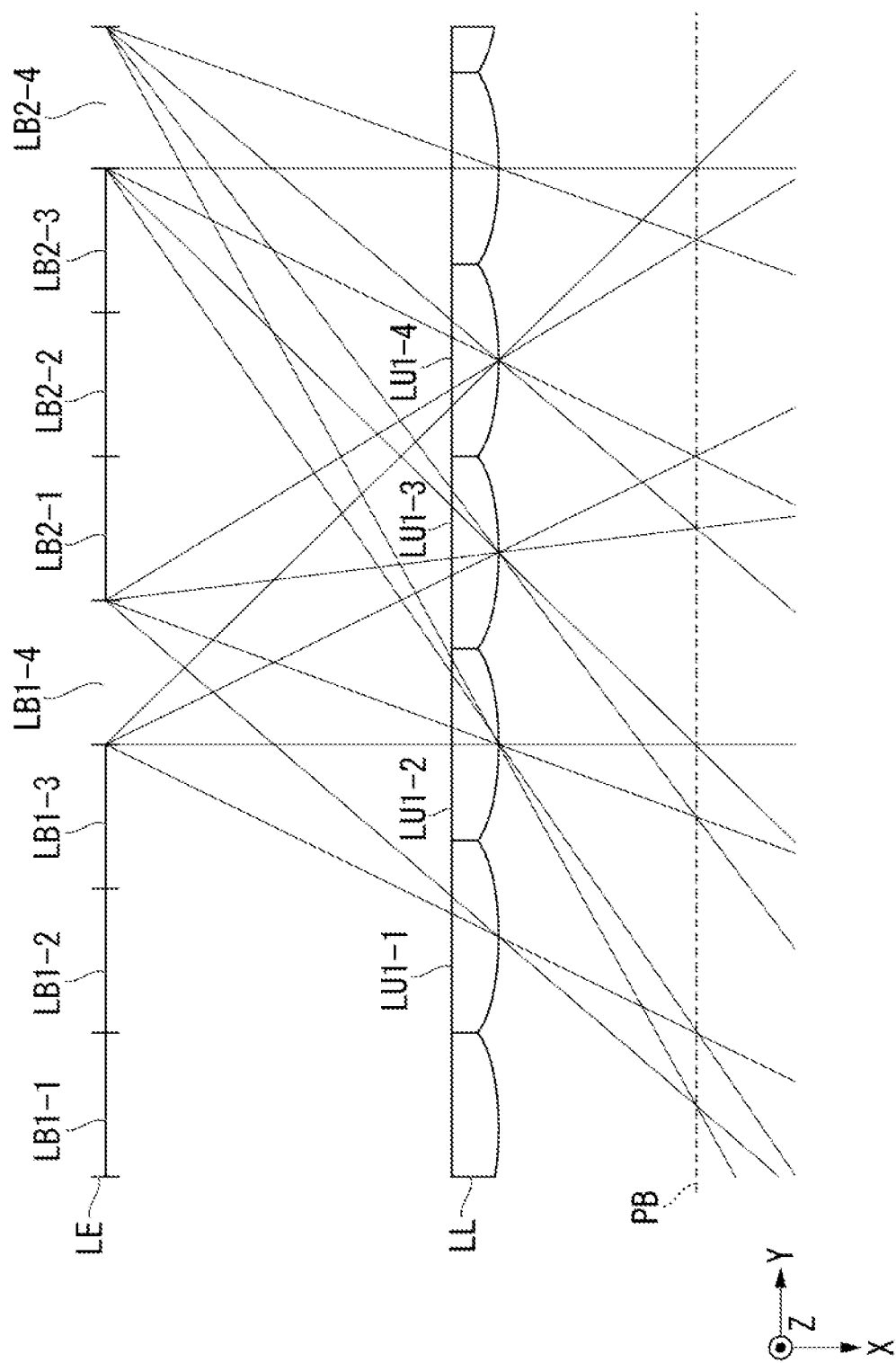
FIG. 1 is a diagram illustrating an example of a configuration of a parallax barrier according to an embodiment of the present invention.

FIG. 1 is a diagram illustrating an example of a configuration of a parallax barrier PB according to the present embodiment. In the present embodiment, an example in which the parallax barrier method is a parallax barrier method based on time division will be described. Although, in the present embodiment, an example in which the number of divisions in time division in the parallax barrier method based on time division is four will be described, the same applies to the number of divisions in time division other than four. In the following description, the number of divisions in time division may be simply referred to as the number of divisions.

The parallax barrier PB according to the present embodiment is implemented by using a light source unit LE and a lenticular lens LL.

The light source unit LE includes a plurality of strip-shaped light sources LB. Here, the strip shape is an elongated shape having a constant width like a strip. The strip shape is also referred to as a rectangular shape. FIG. 1 illustrates, as a plurality of strip-shaped light sources LB, strip-shaped light sources LB1-1 to LB1-4 and strip-shaped light sources LB2-1 to LB2-4. The plurality of strip-shaped light sources LB irradiates an image display surface DS (not illustrated in FIG. 1) with illumination light. The strip-shaped light sources LB include, for example, a light emitting diode (LED). The plurality of strip-shaped light sources LB is an example of a plurality of strip-shaped light sources that are arranged on an illumination arrangement surface LS (not illustrated in FIG. 1 but illustrated in FIG. 2), which is a surface located on the back surface side of an image forming unit, and that irradiate the image display surface DS with illumination light. The strip-shaped light sources LB may include a laser diode (LD), also referred to as a semiconductor laser, having a radiation angle equal to or larger than a predetermined angle, instead of an LED.

Figure 2:
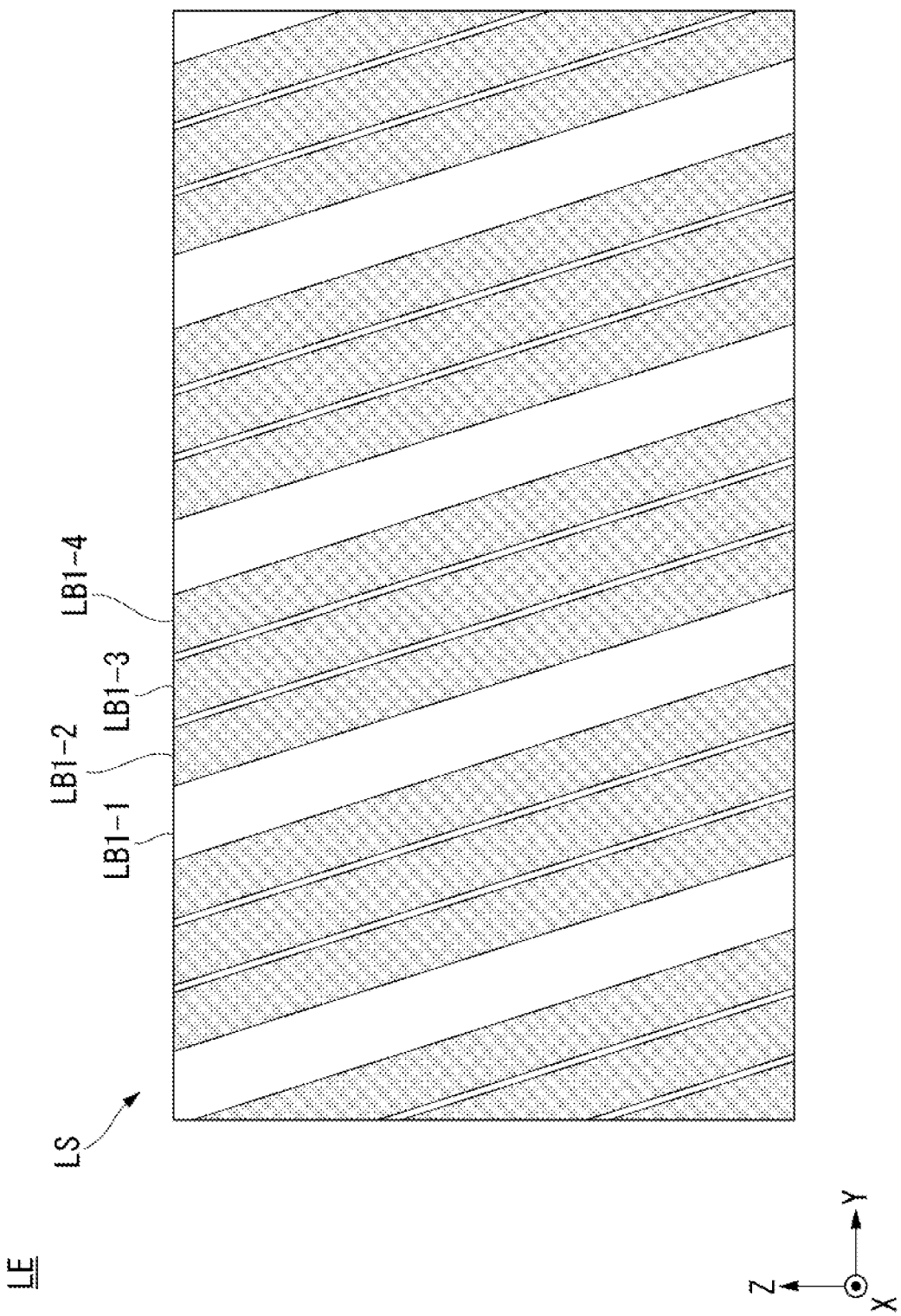
FIG. 2 is a diagram illustrating an example of an arrangement of a plurality of strip-shaped light sources according to an embodiment of the present invention.

Here, the arrangement of the plurality of strip-shaped light sources LB will be described with reference to FIG. 2. FIG. 2 is a diagram illustrating an example of an arrangement of a plurality of strip-shaped light sources LB according to the present embodiment. FIG. 2 illustrates the strip-shaped light source LB1-1, the strip-shaped light source LB1-2, the strip-shaped light source LB1-3, and the strip-shaped light source LB1-4 of the plurality of strip-shaped light sources LB. As illustrated in FIG. 2, the plurality of strip-shaped light sources LB is inclined at a predetermined angle with respect to the vertical direction on the illumination arrangement surface LS. The shape of the strip-shaped light sources LB is substantially a parallelogram. The parallelogram has a long side in the vertical direction of the illumination arrangement surface LS. The strip shape is also referred to as a rod shape. In the light source unit LE, a plurality of strip-shaped light sources LB is arrayed on the illumination arrangement surface LS. The plurality of strip-shaped light sources LB is arrayed substantially in parallel with each other.

The illumination arrangement surface LS is a control surface for variably controlling arrangement of illumination light on the image display surface DS. The illumination light is radiated from the back surface of the image display surface DS to the image display surface DS. In the parallax barrier method based on time division, according to the number of divisions is four, one strip-shaped light source that emits light is periodically changed in a predetermined order in units of four strip-shaped light sources. The example illustrated in FIG. 2 illustrates a state in which the strip-shaped light source LB1-1 is emitting light and the strip-shaped light source LB1-2, the strip-shaped light source LB1-3, and the strip-shaped light source LB1-4 are not emitting light. The same applies to the strip-shaped light sources other than the strip-shaped light source LB1-1, the strip-shaped light source LB1-2, the strip-shaped light source LB1-3, and the strip-shaped light source LB1-4 of the plurality of strip-shaped light sources LB.

The width (the length in the horizontal direction, that is, the length in the Y-axis direction) of the illumination arrangement surface LS may be substantially equal to the width of the image display surface DS, or may be wider than the width of the image display surface DS by a predetermined width.

In the present embodiment, a plurality of illumination arrangement control elements (not illustrated) is arranged in a matrix shape on the illumination arrangement surface LS. The plurality of strip-shaped light sources LB is implemented as a light emission pattern obtained by the plurality of illumination arrangement control elements each controlling a plurality of LEDs.

The light source unit LE may have a configuration in which a plurality of strip-shaped (or rod-shaped) lights is arrayed instead of the configuration in which the plurality of illumination arrangement control elements is arranged in a matrix shape on the illumination arrangement surface LS.

As described above, the plurality of strip-shaped light sources LB is inclined at a predetermined angle with respect to the vertical direction on the illumination arrangement surface LS. When the plurality of strip-shaped light sources LB is not inclined at a predetermined angle with respect to the vertical direction, the slit area of the parallax barrier PB can be translationally moved only by a distance in units of one subpixel. On the other hand, when the plurality of strip-shaped light sources LB is inclined at a predetermined angle with respect to the vertical direction of the illumination arrangement surface LS as in the present embodiment, the slit area of the parallax barrier PB can be translationally moved by a distance of larger than zero and equal to or smaller than one subpixel. In other words, when the plurality of strip-shaped light sources LB is inclined at a predetermined angle with respect to the vertical direction on the illumination arrangement surface LS, the position of the slit area can be translationally moved by a finer distance than that in a case where the strip-shaped light sources LB are not inclined.

The plurality of strip-shaped light sources LB does not need to be inclined at a predetermined angle with respect to the vertical direction on the illumination arrangement surface LS. That is, the plurality of strip-shaped light sources LB may be arranged substantially parallel to the vertical direction on the illumination arrangement surface LS.

Returning to FIG. 1, the description of the configuration of the parallax barrier PB will be continued. The lenticular lens LL is arranged on a side of the image display surface DS (i.e., the front side) from the light source unit LE. The lenticular lens LL includes a plurality of element lenses LU. The element lenses LU are columnar convex lenses whose bottom surface is substantially semicircular. The plurality of element lenses LU in the lenticular lens LL is arrayed in a planar shape substantially parallel to each other in the height direction of the columnar bodies of the element lenses LU.

When illumination light radiated from the plurality of strip-shaped light sources LB is incident, the lenticular lens LL forms an image of the illumination light on the back surface side of the image display surface DS. In the parallax barrier PB according to the present embodiment, the image of the illumination light from the strip-shaped light sources LB formed on the back surface side of the image display surface DS by the element lenses LU included in the lenticular lens LL is used as a slit area of the parallax barrier method. The focal length of the element lenses LU is a predetermined focal length selected in accordance with a predetermined position at which the parallax barrier PB is arranged.

The length direction of the strip shape of the strip-shaped light sources LB and the height direction of the columnar shape of the element lenses LU included in the lenticular lens LL are substantially parallel to each other. In the present embodiment, according to the plurality of strip-shaped light sources LB being inclined at a predetermined angle in the vertical direction of the illumination arrangement surface LS, the element lenses LU included in the lenticular lens LL are arranged on a surface positioned on the side of the image display surface DS from the light source unit LE with the height direction of the columnar shape of the element lenses LU inclined at the predetermined angle with respect to the vertical direction of the illumination arrangement surface LS.

The lenticular lens LL is an example of an image forming unit in which a plurality of optical members having a plurality of strip-shaped patterns with optical properties is arranged on the surface on the back surface side of the image display surface DS. Any optical member that forms an image of illumination light from the strip-shaped light source LB on the back surface side of the image display surface DS can be used as an image forming unit instead of the lenticular lens LL. That is, an optical member having optical properties equivalent to the optical properties of the lenticular lens LL in which the plurality of element lenses LU is arranged may be used instead of the lenticular lens LL. The optical properties equivalent to the optical properties of the lenticular lens LL are optical properties that do not change in the vertical direction (or a direction inclined at a predetermined angle when the plurality of strip-shaped light sources LB is inclined at the predetermined angle with respect to the vertical direction on the illumination arrangement surface LS as in the present embodiment). The optical properties include, for example, refractive index and/or transmittance. For example, instead of the element lens LU, a columnar plane lens having a refractive index changed in the lens may be used. In addition, for example, an optical member which is a plate-shaped (rectangular parallelepiped-shaped) optical member made of a plurality of types of materials and has a strip-shaped distribution pattern of refractive index values, that is, has the refractive index that changes at predetermined intervals only in the horizontal direction and is constant in the vertical direction may be used.

Figure 3:
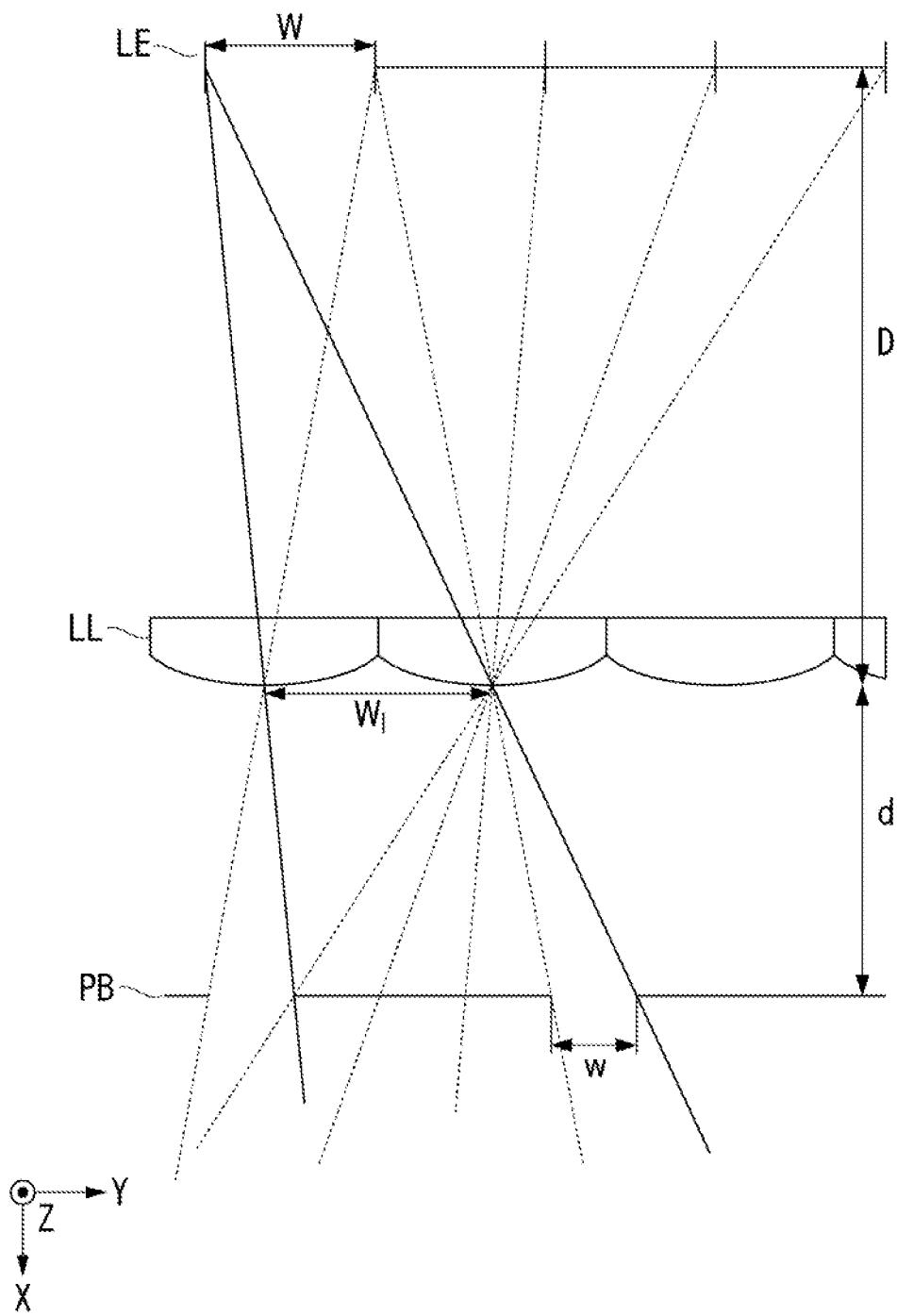
FIG. 3 is a diagram illustrating an example of the relationship between the width of a strip-shaped light source and the width of a slit area according to an embodiment of the present invention.

Here, a relationship between the width of a strip-shaped light source LB and the width of a slit area of the parallax barrier PB will be described with reference to FIG. 3. FIG. 3 is a diagram illustrating an example of a relationship between the width of the strip-shaped light source LB and the width of the slit area according to the present embodiment. The length of a short side of the parallelogram which is the shape of the strip-shaped light source LB is referred to as the width of the strip-shaped light source LB. The width of the strip-shaped light source LB is defined as a width W. The distance between the light source unit LE and the lenticular lens LL in the depth direction is defined as a distance D. The distance between the lenticular lens LL and the parallax barrier PB in the depth direction is defined as a distance d. The width of the slit area of the parallax barrier PB is defined as a slit width w. The distance D, the distance d, the width W, and the slit width w satisfy the relationship expressed by Equation (1) from the similarity of the triangles.

[Math. 1]

$$D:d=W:w \qquad (1)$$

Here, the distance D is longer than the distance d, and the width W is longer than the slit width w. That is, the parallax barrier PB implements the slit width w shorter than the width W of the plurality of strip-shaped light sources LB arranged in the light source unit LE. As the distance D becomes longer than the distance d, the slit width w becomes shorter than the width W. For this reason, increasing the distance D between the light source unit LE and the lenticular lens LL forms a slit area having a narrow width in the parallax barrier PB.

Here, in the lenticular lens LL, the distance between the centers of the plurality of element lenses LU is referred to as a pitch $W_1$ of the element lenses LU. The distance D, the distance d, the slit width w, and the pitch $W_1$ have a relationship represented by Equation (2).

[Math. 2]

$$D:(D+d)=W_1:nw \qquad (2)$$

Figure 4:
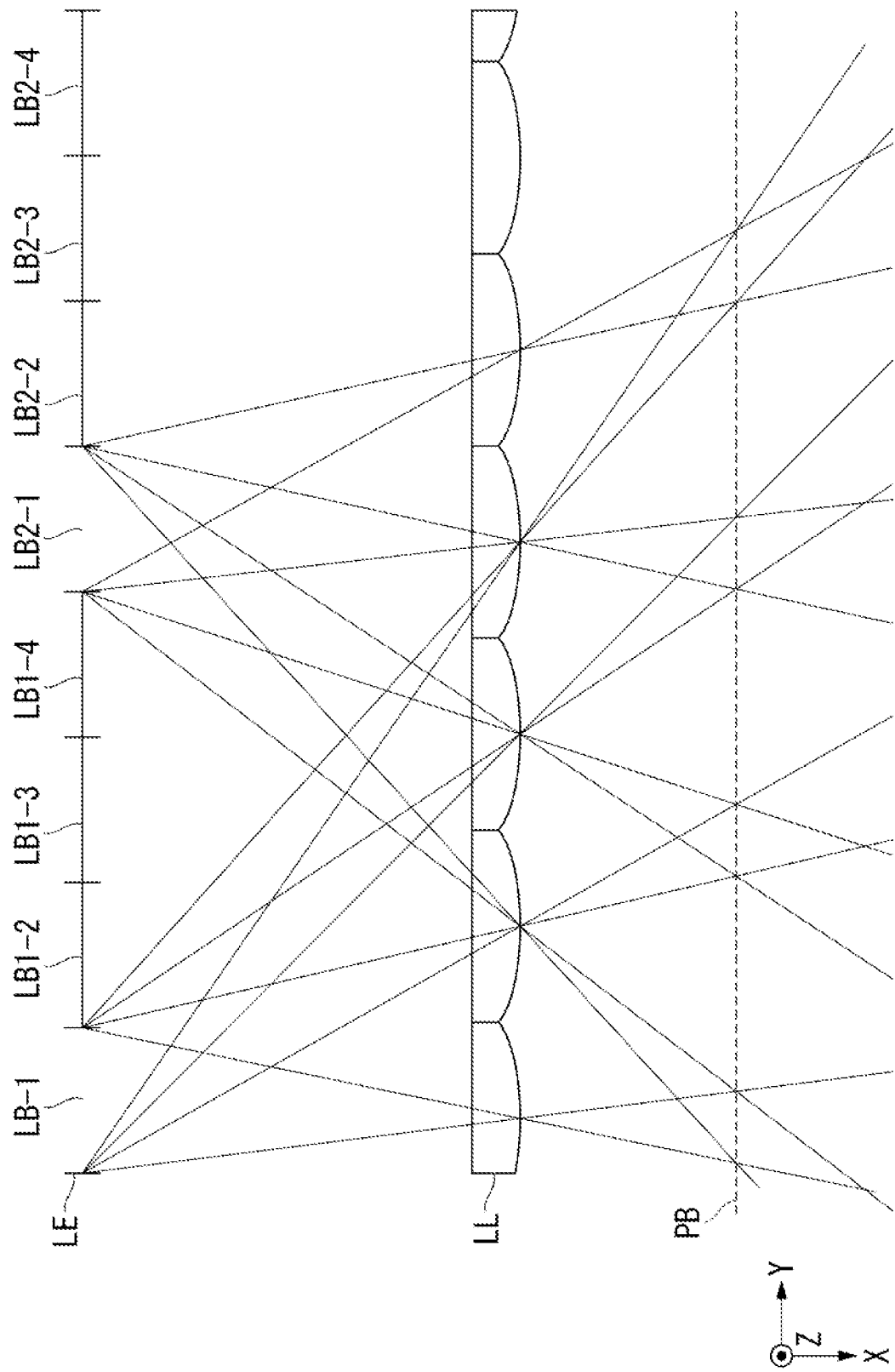
FIG. 4 is a diagram illustrating an example of overlapping of slit areas according to an embodiment of the present invention.

In Equation (2), the number n indicates the number of divisions. When the relationship represented by Expression (2) is satisfied, the slit areas formed by the images of the illumination light from the different strip-shaped light sources LB do not overlap each other. On the other hand, when the relationship represented by Expression (2) is not satisfied, the slit areas overlap each other as illustrated in FIG. 4. In FIG. 4, the slit area formed by the image of illumination light from the strip-shaped light sources LB1-1 and the slit area formed by the image of illumination light from the strip-shaped light sources LB2-1 overlap each other.

Figure 5:
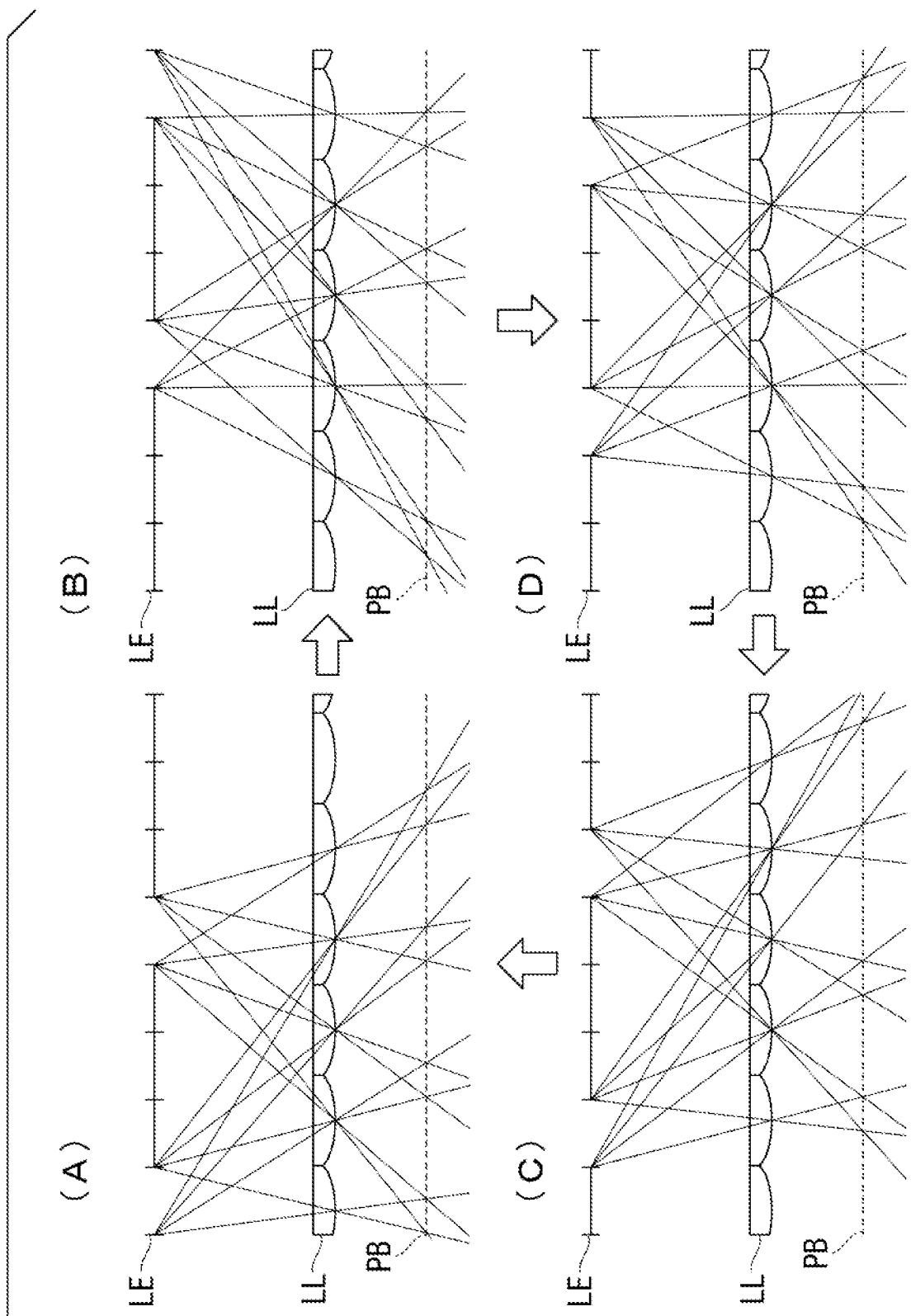
FIG. 5 is a diagram illustrating an example of a changing pattern of a parallax barrier according to an embodiment of the present invention.

Here, a pattern in which the slit areas of the parallax barrier PB change will be described with reference to FIG. 5. FIG. 5 is a diagram illustrating an example of a pattern in which a parallax barrier PB changes according to an embodiment of the present invention. As described above, a plurality of illumination arrangement control elements is arranged in a matrix shape on the illumination arrangement surface LS to control a plurality of LEDs. For this reason, the light source unit LE can change the light emission pattern of the strip-shaped light sources LB at high speed. Since the parallax barrier PB is an image formed of the illumination light from the strip-shaped light sources LB through the lenticular lens LL, the position and/or the width of the slits can be changed by changing the light emission pattern of the plurality of strip-shaped light sources LB on the illumination arrangement surface LS at high speed. Alternatively, the parallax barrier PB can be caused to blink.

In FIG. 5, the light emission patterns of the strip-shaped light sources LB changes in the order of FIG. 5(A), FIG. 5(B), FIG. 5(C), and FIG. 5(D), and the positions of the slit areas of the parallax barrier PB changes in a pattern in accordance with each of the light emission patterns.

FIG. 5 illustrates a case where the distance between the light source unit LE and the lenticular lens LL is not sufficiently longer than the distance between the lenticular lens LL and the parallax barrier PB to make it easier to see the changing pattern of the positions of the slit areas. Although the parallax barrier PB illustrated in FIG. 5 is indicated by a plurality of dots, when the distance between the light source unit LE and the lenticular lens LL is sufficiently longer than the distance between the lenticular lens LL and the parallax barrier PB, a slit area having a width of about the pitch of the plurality of dots is implemented. In addition, FIG. 5 illustrates a case where the slit areas which are images of illumination light from different strip-shaped light sources LB overlap to make it easier to see the changing pattern of the positions of the slit areas.

Configuration of Image Display System

Figure 6:
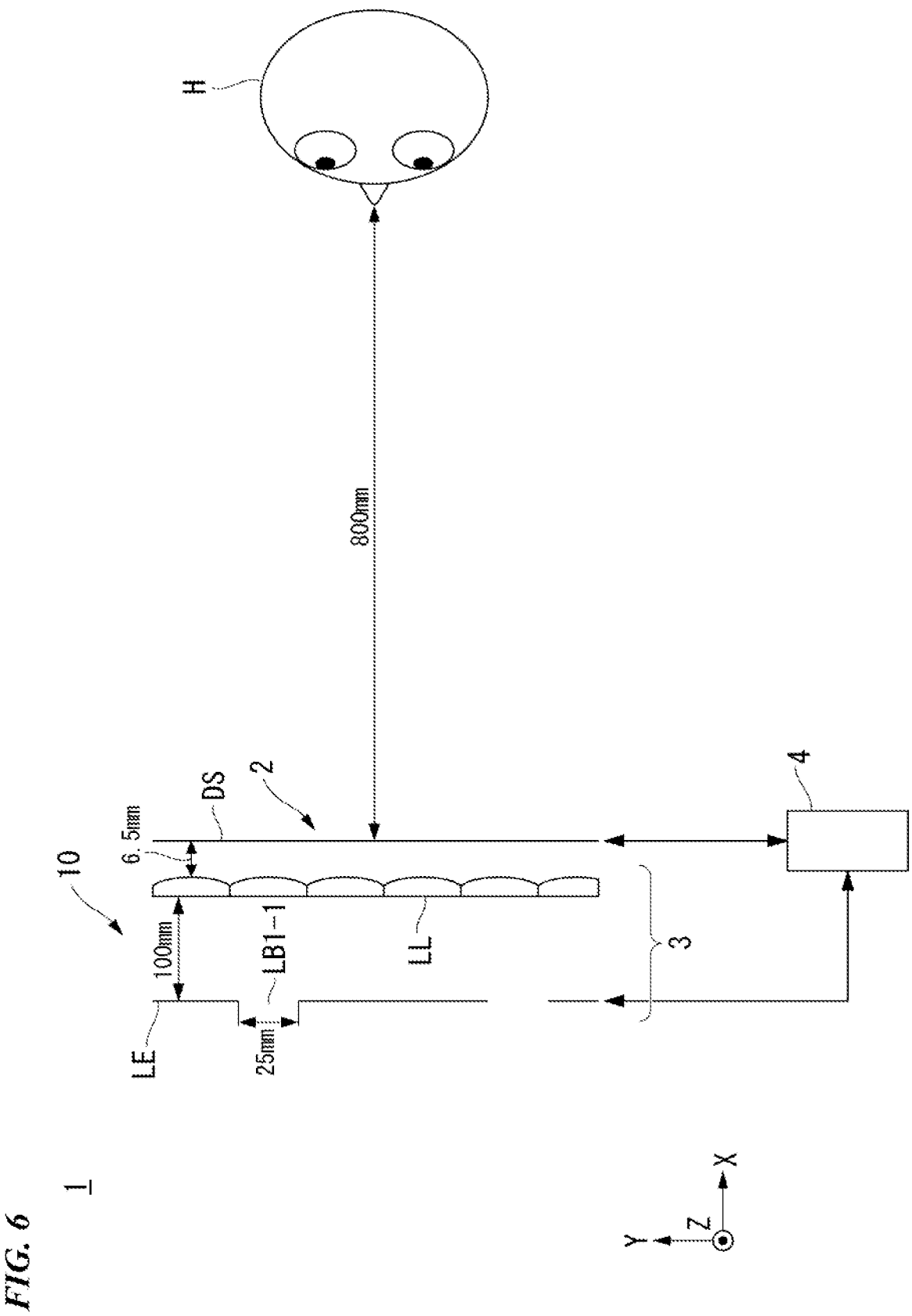
FIG. 6 is a diagram illustrating an example of a configuration of an image display system according to an embodiment of the present invention.

FIG. 6 is a diagram illustrating an example of a configuration of an image display system 1 according to the present embodiment. The image display system 1 is a system for displaying a stereoscopic image by using the parallax barrier PB described above. The image display system 1 includes an image display device 10. The image display device 10 displays a stereoscopic image using the parallax barrier method based on time division. The image display device 10 includes a display unit 2, an irradiation unit 3, and a control device 4.

The display unit 2 includes a transmissive image display surface DS on which images of left-eye image data and images of right-eye image data are alternately displayed. The display unit 2 includes a liquid crystal display (LCD) as the image display surface DS. The irradiation unit 3 includes the light source unit LE and the lenticular lens LL described above. In the example illustrated in FIG. 6, the illumination arrangement surface LS included in the light source unit LE includes an LCD instead of an illumination arrangement surface with LEDs arranged in a matrix shape. The size of the LCD provided on each of the image display surface DS and the illumination arrangement surface LS is 24 inches.

The distance between the light source unit LE and the lenticular lens LL is 100 mm in the example illustrated in FIG. 6. The distance between the lenticular lens LL and the image display surface DS is 6.5 mm. The number of pixels on the illumination arrangement surface LS is 1920×1080 pixels. The width of each strip-shaped light source LB included in the light source unit LE is 25 mm. The pitch of element lenses LU is 0.7 mm. The radius of the substantially semicircular bottom surface of a columnar element lens LU is 0.5 mm.

The control device 4 controls the image display device 10 overall. The control device 4 controls each of the display unit 2 and the irradiation unit 3. The control device 4 is a personal computer (PC) as an example.

An observer H observes the image display surface DS. The observer H observes the image display surface DS from a position where the distance between at least one of his or her eyes and the image display surface DS is 800 mm.

Functional Configuration of Control Device

A functional configuration of the control device 4 will be described below with reference to FIG. 7.

Figure 7:
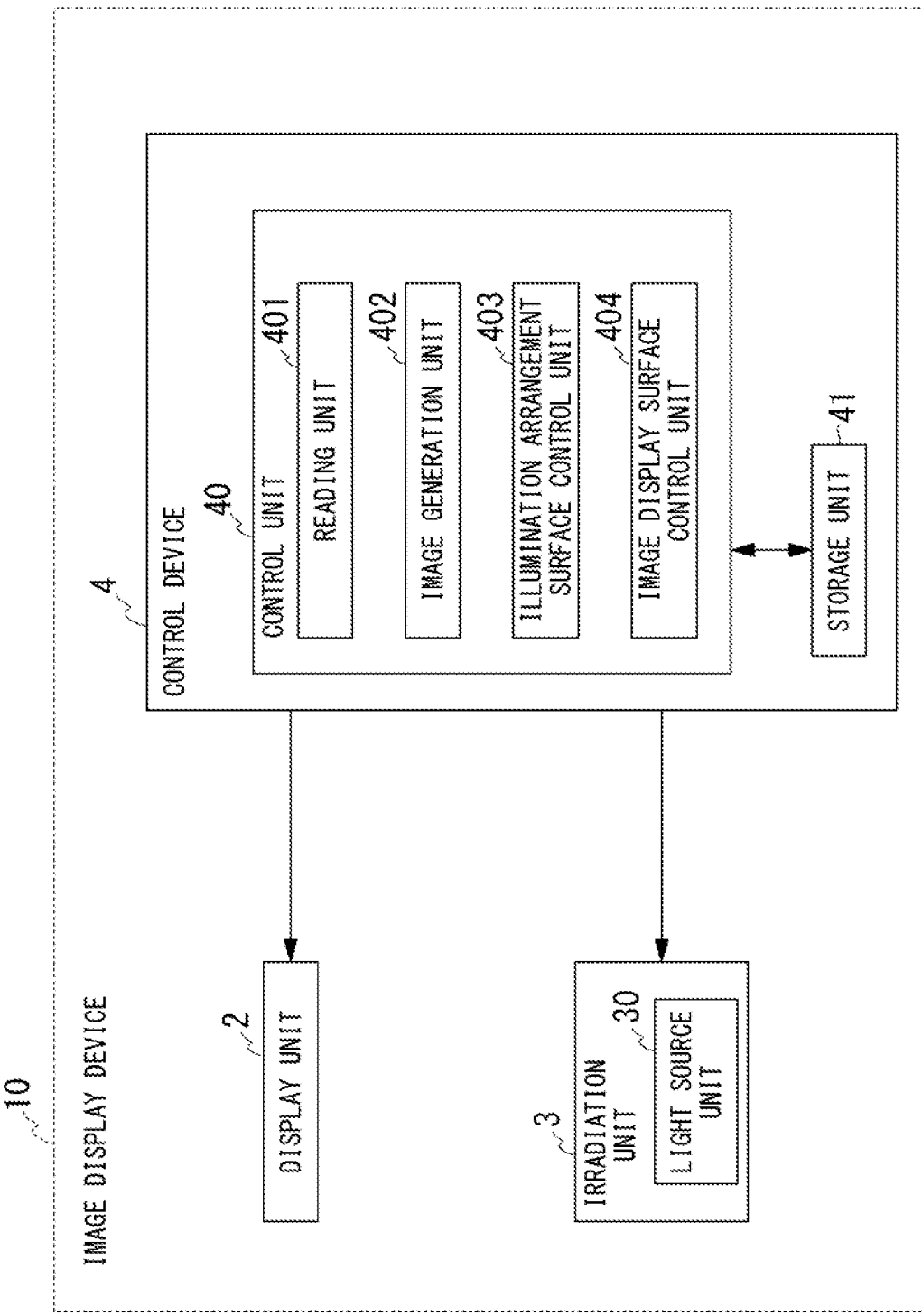
FIG. 7 is a diagram illustrating an example of a functional configuration of a control device according to an embodiment of the present invention.

FIG. 7 is a diagram illustrating an example of a functional configuration of the control device 4 according to the present embodiment. The control device 4 includes a control unit 40 and a storage unit 41.

The control unit 40 controls the control device 4 overall. The control unit 40 includes a reading unit 401, an image generation unit 402, an illumination arrangement surface control unit 403, and an image display surface control unit 404.

These functional units of the control unit 40 are implemented by, for example, a central processing unit (CPU), which is not illustrated, executing various programs stored in a storage unit 41, which will be described later. In addition, some or all of the functional units may be a hardware functional unit such as an application-specific standard product (ASSP) or an application-specific integrated circuit (ASIC).

The reading unit 401 reads various kinds of information stored in the storage unit 41 in advance. The various kinds of information include first image data and a parameter set PS. The first image data is image data of image including parallax information. The first image data may be image data of a video or may be image data of a still image. The parameter set PS includes the number of divisions, the slit width, and the inclination of the slit.

The image generation unit 402 generates left image data and right image data based on the first image data read by the reading unit 401 from the storage unit 41 and the number of divisions indicated by the parameter set PS.

The illumination arrangement surface control unit 403 controls the light source unit 30 included in the irradiation unit 3 to generate the parallax barrier PB. The light source unit 30 includes a configuration similar to that of the light source unit LE described above. The illumination arrangement surface control unit 403 controls the plurality of LEDs via the plurality of illumination arrangement control elements arranged on the illumination arrangement surface LS such that the light emission pattern of the plurality of strip-shaped light sources LB is changed. That is, the illumination arrangement surface control unit 403 changes the arrangement of the light emitting region on the image display surface DS in which illumination light radiated by the strip-shaped light sources LB is generated by changing any of the plurality of strip-shaped light sources LB to emit light.

The image display surface control unit 404 causes an image to be displayed on the image display surface DS included in the display unit 2. The image display surface control unit 404 causes an image to be displayed based on the parameter set PS and the left image data and the right image data generated by the image generation unit 402.

Here, the image display surface control unit 404 controls the image display surface DS based on left-eye image data and right-eye image data. The image display surface control unit 404 controls each area of a left image region and a right image region in accordance with the arrangement of the slit areas which changes in accordance with the arrangement of the light emitting region on the image display surface DS. The left image region is a region on the image display surface DS in which an image of the left-eye image data is displayed. The right image region is a region on the image display surface DS in which an image of the right-eye image data is displayed.

Since the illumination arrangement surface control unit 403 is included in the image display device 10, the position and/or the width of the slits can be changed by changing the light emission pattern of the plurality of strip-shaped light sources LB on the illumination arrangement surface LS at high speed. Alternatively, the parallax barrier PB can be caused to blink.

Although an example in which the image display device 10 includes the illumination arrangement surface control unit 403 has been described in the present embodiment, the present invention is not limited thereto. Any other mechanism that can change the arrangement of the light emitting region on the image display surface DS by changing any of the plurality of strip-shaped light sources LB to emit light may be used.

Although an example in which the image display device 10 displays a stereoscopic image using the parallax barrier method based on time division has been described in the present embodiment, the invention is not limited thereto. The image display device 10 may display a stereoscopic image using a static parallax barrier method. In the static parallax barrier method, the arrangement of the light emitting region on the illumination arrangement surface LS in which illumination light is generated does not change over time. In other words, when a stereoscopic image is displayed in the static parallax barrier method, the image display device 10 does not switch the position of the parallax barrier PB. In this case, the illumination arrangement surface control unit 403 may be omitted from the configuration of the image display device 10.

As described above, the image display device 10 according to the present embodiment is an image display device for displaying a stereoscopic image using the parallax barrier method, and includes the image display surface DS, the image forming unit (the lenticular lens LL in the present embodiment), and the plurality of strip-shaped light sources (the plurality of strip-shaped light sources LB in the present embodiment).

A plurality of optical members (the element lenses LU in the present embodiment) having a plurality of strip-shaped patterns with optical properties on the surface located on the back surface side of the image display surface DS are arranged in the image forming unit (the lenticular lens LL in the present embodiment). The plurality of strip-shaped light sources (the plurality of strip-shaped light sources LB in the present embodiment) is arranged on the illumination arrangement surface LS, which is the surface located on the back surface side of the image forming unit (the lenticular lens LL in the present embodiment), and irradiates the image display surface DS with illumination light.

In the image display device 10 according to the present embodiment, the slit areas of the parallax barrier method is formed by the image obtained by forming an image of illumination light from the strip-shaped light sources (the strip-shaped light sources LB in the present embodiment) on the back surface side of the image display surface DS by the optical member (the element lenses LU in the present embodiment) included in the image forming unit (the lenticular lens LL in the present embodiment).

Since the parallax barrier PB is an image of the illumination light formed by the convex lens (lenticular lens LL) in this configuration of the image display device 10 according to the present embodiment, an LCD or the like does not have to be used to form a parallax barrier, unlike in the related art (e.g., Patent Document 1), and thus the image display device for displaying a stereoscopic image using the parallax barrier method based on time division can reduce power consumption.

An autostereoscopic video display device of the related art uses two overlapped liquid crystal panels (one of which is a liquid crystal panel for displaying a parallax barrier and the other of which is a liquid crystal panel for displaying an image), lowering the transmittance of illumination light. For this reason, a backlight having an extremely high luminance and high power consumption needs to be used in such an autostereoscopic video display device of the related art. Since illumination light from the light source unit LE is only required to have a luminance at which the illumination light can pass through the lenticular lens LL in the image display device 10, power consumption can be significantly reduced as compared with the case where two liquid crystal panels are overlapped. Here, whereas the visible light transmittance of the lenticular lens LL is about 90% or higher, the visible light transmittance of a liquid crystal panel is about 20 to 30% at most.

Furthermore, the autostereoscopic video display device of the related art causes the liquid crystal panels to emit light to be used as a so-called backlight, and in such a case, causes all elements of the liquid crystal panels to emit light regardless of a difference in luminance between the slit areas and the barrier areas. The image display device 10 causes only the light emitting region on the illumination arrangement surface LS to emit light. That is, the area of the light emitting region on the illumination arrangement surface in the image display device 10 is 1/the number of divisions in that in the related art. Thus, the image display device 10 only has about 1/the number of divisions the power consumption compared to that in the related art.

Modified Example

A modified example of the above-described embodiment will be described below in detail with reference to the drawings.

The distance between an observer H and the image display surface DS may change. In this case, the number of divisions in time division needs to be changed according to the distance to suppress crosstalk between the left-eye image and the right-eye image. Here, in such an autostereoscopic video display device of the related art, the parallax barrier is displayed as an image on the display surface of an LCD or the like as described above. For this reason, the widths of the slit areas are changed in the autostereoscopic video display device of the related art in accordance with the change in the number of divisions by controlling the pixels of the display surface.

The parallax barrier PB of the image display device 10 according to the embodiment is an image formed by illumination light through the convex lens as described above. For this reason, it is conceivable to change images displayed on the image display surface DS in the image display device 10, instead of changing the widths of the slits when the distance between the observer H and the image display surface DS changes. In the present modification example, a case where a left-eye image and a right-eye image displayed on the image display surface DS are controlled according to the distance between an observer H and the image display surface DS will be described.

Figure 8:
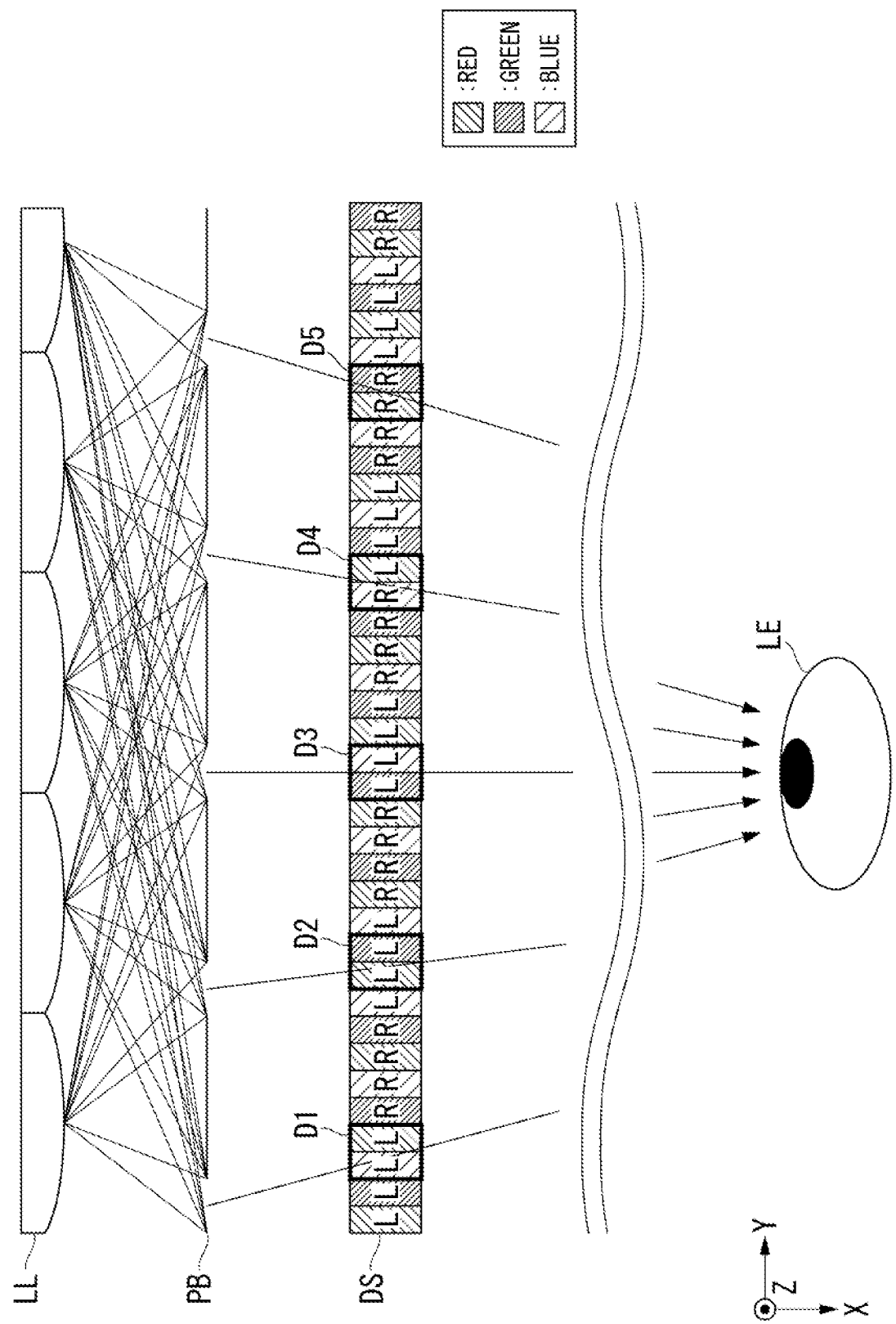
FIG. 8 is a diagram illustrating an example of crosstalk according to a modified example of an embodiment of the present invention.

FIG. 8 is a diagram illustrating an example of crosstalk according to the modified example of the present embodiment. There is a case where widths of the slit areas of the parallax barrier PB does not match widths of pixels on the image display surface DS. In this case, crosstalk may occur between the left-eye images and the right-eye images as illustrated in FIG. 8. Crosstalk between a left-eye image and a right-eye image is a phenomenon that illumination light transmitted through a pixel in which the left-eye image is displayed is incident on the right eye or illumination light transmitted through a pixel in which the right-eye image is displayed is incident on the left eye.

FIG. 8 illustrates subpixels on the image display surface DS. A subpixel is each one of partial pixels which are obtained by equally dividing each pixel constituting an image to be displayed in the image display system 1 into m (m is an integer equal to or greater than 2) in the vertical direction (in other words, n partial pixels arrayed in the horizontal direction in each pixel). A subpixel may be each of partial pixels which are obtained by equally dividing each pixel constituting an image to be displayed in the image display system 1 into m in a direction different from the vertical direction.

Either a left-eye image or a right-eye image is displayed on each subpixel. In FIG. 8, a left-eye image is denoted by the letter "L," and a right-eye image is denoted by the letter "R." In the following description, on the image display surface DS, a region occupied by subpixels in which left-eye images are displayed is also referred to as a left-image region, and a region occupied by subpixels in which right-eye images are displayed is also referred to as a right image region.

In FIG. 8, left-eye images are displayed in regions D1, D2, D3, and D5 on the image display surface DS, and illumination light transmitted through the pixel is incident on the left eye LE. On the other hand, both a left-eye image and a right-eye image are displayed in the region D4, and the right-eye image included in the region D4 is incident on the left eye LE.

Figure 9:
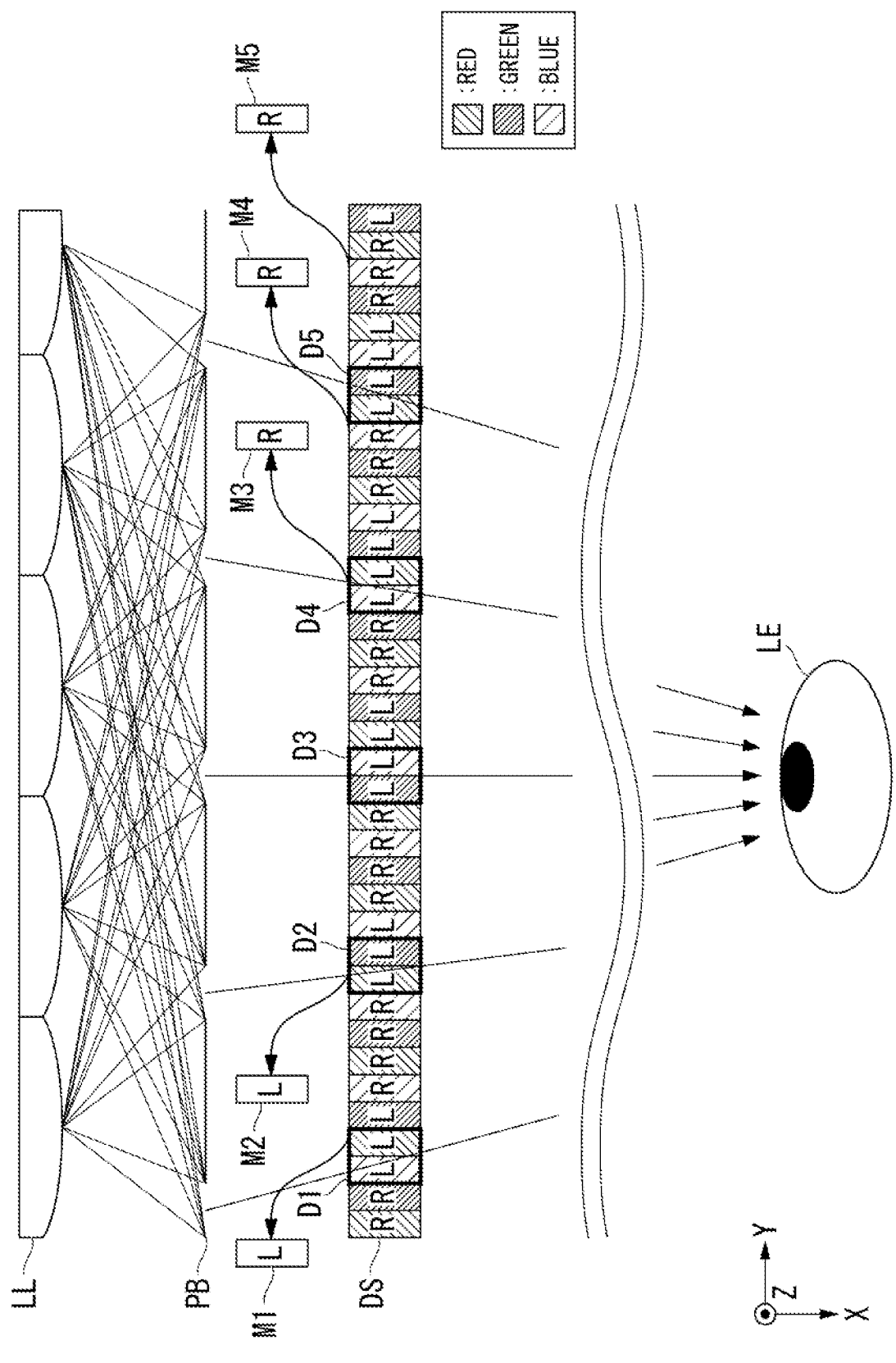
FIG. 9 is a diagram illustrating an example of an arrangement of a left-eye image and a right-eye image according to a modified example of an embodiment of the present invention.

To eliminate crosstalk, the arrangement of left-eye images and right-eye images is changed as illustrated in FIG. 9 in the present modified example. For a cycle in which left-eye images and right-eye images are arranged in subpixels, in FIG. 8, the left-eye images and the right-eye images are each continuously arranged in four subpixels, and the cycle in which the left-eye images and the right-eye images are arranged in subpixels corresponds to eight subpixels.

On the other hand, in FIG. 9, the cycle in which left-eye images and right-eye images are arranged in subpixels corresponds to seven subpixels. Here, in the regions on the left side from the region D3, the left-eye images are continuously arranged in three subpixels, and the right-eye images are continuously arranged in four subpixels. In the regions on the right side from the region D3 including the region D3, the left-eye images are continuously arranged in four subpixels, and the right-eye images are continuously arranged in three subpixels.

As a result, the left-eye images are displayed in the regions D1, D2, D3, D4, and D5, and crosstalk does not occur. That is, the left-eye images are viewable only to the left eye LE. The cycle of the changed arrangement of the subpixels is determined according to the distance between the observer H and the image display surface DS.

FIG. 9 illustrates subpixels M1 to M5 as subpixels removed from the arrangement of the subpixels in FIG. 8 for explanation, and these subpixels M1 to M5 are not actually arranged.

The image display system according to the present modified example is referred to as an image display system 1a, and the image display device is referred to as an image display device 10a. The image display device 10a includes a control device 4a as a control device.

Figure 10:
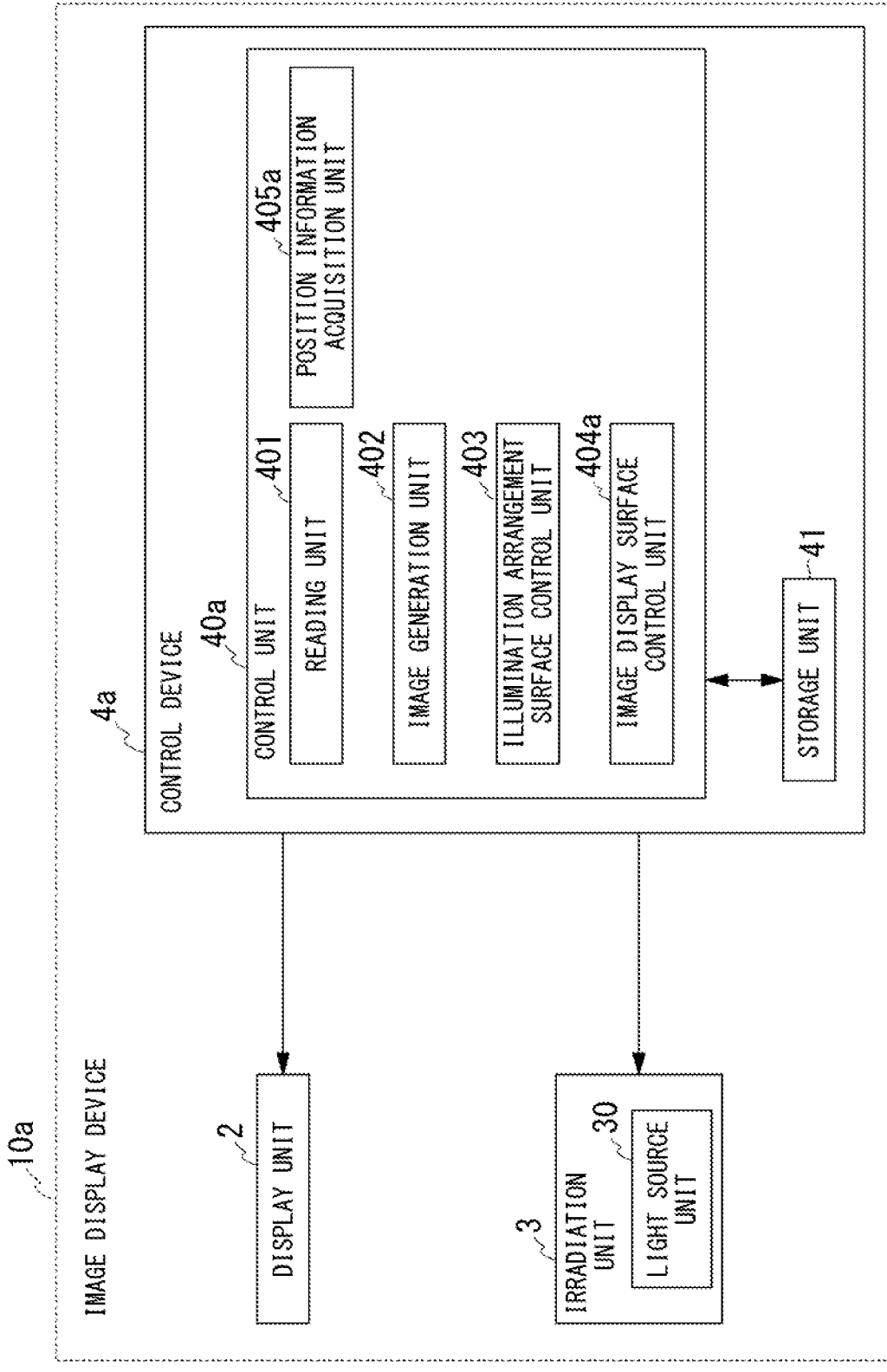
FIG. 10 is a diagram illustrating an example of a functional configuration of a control device according to a modified example of an embodiment of the present invention.

FIG. 10 is a diagram illustrating an example of a functional configuration of the control device 4a according to the present modified example. The control device 4a includes a control unit 40a and a storage unit 41. The control unit 40a includes a reading unit 401, an image generation unit 402, an illumination arrangement surface control unit 403, an image display surface control unit 404a, and a position information acquisition unit 405a.

Here, when the control device 4a according to the present modified example (FIG. 10) is compared with the control device 4 according to the embodiment (FIG. 7), the image display surface control unit 404a and the position information acquisition unit 405a are different in the control unit 40a. Here, the functions of the other components (the reading unit 401, the image generation unit 402, the illumination arrangement surface control unit 403, and the storage unit 41) are the same as those in the embodiment. Description of the same functions as those of the embodiment is omitted, and differences from the embodiment will mainly be described in a second embodiment.

The same configurations as those of the above-described embodiment are denoted by the same reference numerals, and description of the same configurations and operations is omitted.

The position information acquisition unit 405a acquires position information indicating an observer distance. An observer distance is the distance between the image display surface DS and at least one eye of the eyes of the observer H observing the image display surface DS.

The image display surface control unit 404a controls the left image region and the right image region based on the observer distance indicated by the position information acquired by the position information acquisition unit 405a. Here, as described with reference to FIG. 9, the image display surface control unit 404a changes the cycle in which the left image region and the right image region are arranged on the image display surface DS based the observer distance.

The image display device 10a according to the present modified example includes the position information acquisition unit 405a and the image display surface control unit 404a and thus can control the left image region and the right image region based on the observer distance, allowing occurrence of crosstalk between the left-eye images and the right-eye images to be suppressed.

Example(s)

Figure 11:
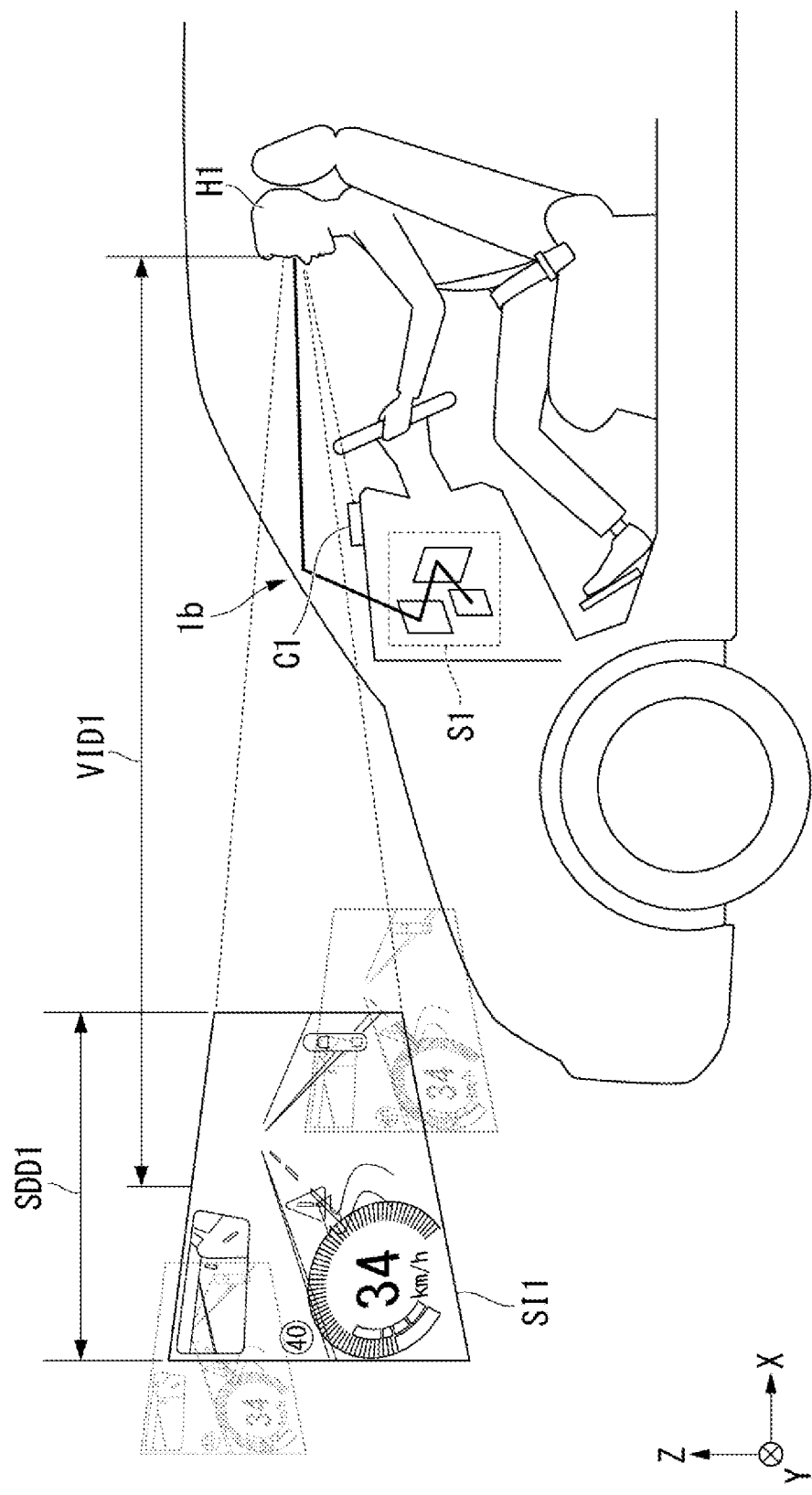
FIG. 11 is a diagram illustrating an example of a configuration of a head-up display according to an example of the present invention.

An example in which the image display system according to the above-described embodiment is used for an in-vehicle head-up display (HUD) will be described. FIG. 11 is a diagram illustrating an example of a configuration of an HUD 1b according to the present example. As an example, the HUD 1b is displayed by projecting an image SI1 on the windshield of an automobile. The image SI1 is a stereoscopic image through a parallax barrier. A driver H1 drives while observing various kinds of information displayed as the image SI1 on the windshield.

The HUD 1b includes an image display device S1 and a camera C1.

The configuration of the image display device S1 is similar to that of the image display device 10 (FIG. 7). That is, the image display device S1 includes a light source unit, a lenticular lens, an LCD, a control device, and the like. However, the image display device S1 is different from the image display device 10 in that the display unit is the windshield on which the image SI1 is projected. In addition, the image display device S1 is different from the image display device 10 in that the control device changes the position of the image SI1 projected on the windshield in accordance with the line of sight of the driver H1.

The camera C1 acquires the direction of the line of sight of the driver H1. The camera C1 is an eye-tracking camera. The control device included in the image display device S1 changes the position of the image SI1 projected on the windshield according to the direction of the line of sight of the driver H1 acquired by the camera C1.

When the driver H1 observes the image SI1 projected on the windshield while sitting in the driver's seat, the driver H1 perceives as if the image SI1 were displayed at a position farther from the driver than the position of the windshield, as an example. In FIG. 11, a distance VID1 indicates a virtual distance between the driver H1 and the image SI1 perceived by the driver H1. On the other hand, a depth SDD1 is the depth of the image SI1 as a stereoscopic image.

As described above, the distance VID1 is greater than the distance from the viewpoint of the driver H1 to the windshield corresponding to the display screen on which the image SI1 is displayed.

Part of the image display device 10 according to the above-described embodiment or the image display device 10a, for example, the control unit 40 and the control unit 40a, may be implemented by a computer. In that case, this configuration may be implemented by recording a program for achieving such a control function in a computer-readable recording medium and causing a computer system to read and execute the program recorded in the recording medium. The "computer system" mentioned herein is assumed to be a computer system in which the image display device 10 or the image display device 10a is built and include an OS and hardware such as peripheral equipment. In addition, the "computer-readable recording medium" refers to a portable medium such as a flexible disk, a magneto-optical disk, a ROM, or a CD-ROM, and a storage device such as a hard disk incorporated in a computer system. In addition, the "computer-readable recording medium" may include a recording medium that dynamically stores a program for a short period of time, such as a communication wire when the program is transmitted via a network such as the Internet or a communication line such as a telephone line, and a recording medium that stores a program for a fixed period of time, such as volatile memory inside a computer system that serves as a server or a client in the above-mentioned case. Further, the above-described program may be a program for achieving some of the above-described functions, or may be a program that can achieve the above-described functions in combination with a program that is already recorded in the computer system.

In addition, part or all of the image display device 10 or the image display device 10a according to the above-described embodiments may be implemented as an integrated circuit such as Large-Scale Integration (LSI) or the like. Each of the functional blocks of the image display device 10 and the image display device 10a may be individually implemented as a processor, or some or all thereof may be integrated and implemented as a processor. In addition, a circuit integration method is not limited to LSI and may be implemented by a dedicated circuit or a general-purpose processor. In addition, when an integrated circuit technology that replaces LSI emerges with the progress of semiconductor technologies, an integrated circuit based on the technology may be used.

Although one embodiment of the present invention has been described above in detail with reference to the drawings, specific configurations are not limited to those described above, and various changes in design or the like may be made within the scope that does not depart from the gist of the invention.

REFERENCE SIGNS LIST 10, 10a Image display device
LS Illumination arrangement surface
LB Strip-shaped light source
LL Lenticular lens
LU Element lens
DS Image display surface

What is claimed is:

1. An image display device for displaying a stereoscopic image by using a parallax barrier method, the image display device comprising:
   an image display surface on which an image of left-eye image data and an image of right-eye image data are alternately displayed, the image display surface being transmissive;
   an image forming unit including a plurality of optical members having a plurality of strip-shaped patterns with optical properties arranged on a surface located on a back surface side of the image display surface; and
   a plurality of light sources having a strip shape adjacent to each other in a width direction of an illumination arrangement surface arranged on the illumination arrangement surface, which is a surface located on a back surface side of the image forming unit, and configured to irradiate the image display surface with illumination light, wherein
   a slit area of the parallax barrier method is formed by an image obtained by forming an image of the illumination light from the light sources having a strip shape on the back surface side of the image display surface by using the optical members included in the image forming unit,
   a focal length of the optical member is substantially equal to a distance between a position at which the optical member is arranged and a position at which the slit area of the parallax barrier method is arranged; and
   the plurality of light sources having a strip shape are arranged on the illumination arrangement surface so that, out of the plurality of light sources having a strip shape arranged adjacent to each other in the width direction of the illumination arrangement surface, the images are in the same position for the light sources having a strip shape every predetermined number based on the parallax barrier method.

2. The image display device according to claim 1, wherein the parallax barrier method is a parallax barrier method based on time division,
   the image display device further comprises:
   an illumination arrangement surface control unit configured to change an arrangement of a light emitting region on the illumination arrangement surface in which the illumination light is generated by changing any of the plurality of light sources having a strip shape to emit light; and
   an image display surface control unit configured to control the image display surface based on the left-eye image data and the right-eye image data,
   the image display surface control unit controls, in accordance with an arrangement of the slit area that changes according to the arrangement of the light emitting region, each area of a left image region on the image display surface in which an image of the left-eye image data is displayed and a right image region on the image display surface in which an image of the right-eye image data is displayed.

3. The image display device according to claim 2, further comprising
   a position information acquisition unit configured to acquire position information indicating an observer distance, which is a distance between at least one eye of eyes of an observer observing the image display surface and the image display surface, wherein
   the image display surface control unit controls each area of the left image region and the right image region based on the observer distance indicated by the position information acquired by the position information acquisition unit.

4. The image display device according to claim 2, wherein a distance D that is a distance between at least one of the plurality of light sources and the image forming unit, a distance d that is a distance between the image forming unit and the back surface side of the image display surface, a slit width w that is a width of the slit area, and a pitch $W_1$ that is a distance between centers of the plurality of optical members adjacent to each other arranged in the image forming unit have a relationship represented by Equation (2), where the number of divisions in the time division is a number n $$D:(D+d)=W_1:nw \qquad (2).$$

5. The image display device according to claim 1, wherein an arrangement of a light emitting region on the illumination arrangement surface in which the illumination light is generated does not change over time.

6. An image display method of an image display device for displaying a stereoscopic image by using a parallax barrier method,
   the image display device comprising:
   an image display surface on which an image of left-eye image data and an image of right-eye image data are alternately displayed, the image display surface being transmissive;
   an image forming unit including a plurality of optical members having a plurality of strip-shaped patterns with optical properties arranged on a surface located on a back surface side of the image display surface; and
   a plurality of strip-shaped light sources adjacent to each other in a width direction of an illumination arrangement surface arranged on the illumination arrangement surface, which is a surface located on a back surface side of the image forming unit, and configured to irradiate the image display surface with illumination light,
   wherein a focal length of the optical member is substantially equal to a distance between a position at which the optical member is arranged and a position at which a slit area of the parallax barrier method is arranged; and
   the plurality of light sources having a strip shape are arranged on the illumination arrangement surface so that, out of the plurality of light sources having a strip shape arranged adjacent to each other in the width direction of the illumination arrangement surface, images obtained by forming an image of the illumination light from the strip-shaped light sources on the back surface side of the image display surface by using the optical members included in the image forming unit are in the same position for the light sources having a strip shape every predetermined number based on the parallax barrier method, the image display method comprising:

causing, of the plurality of strip-shaped light sources, a light source corresponding to a light emitting region on the illumination arrangement surface in which the illumination light is generated to emit light;

forming the slit area of the parallax barrier method with the image; and controlling the image display surface based on the left-eye image data and the right-eye image data.

7. The image display device according to claim 3, wherein a distance D that is a distance between at least one of the plurality of light sources and the image forming unit, a distance d that is a distance between the image forming unit and the back surface side of the image display surface, a slit width w that is a width of the slit area, and a pitch W1 that is a distance between centers of the plurality of optical members adjacent to each other arranged in the image forming unit have a relationship represented by Equation (2), where the number of divisions in the time division is a number n $$D:(D+d)=W_1:nw \qquad (2).$$

* * * * *